H. H. Gilmore,

Pipe Wrench.

No. 2,283. Reissued June 12, 1866.

Witnesses
J. B. Crosby
Gordon McKay

Inventor.
Hy H. Gilmore.

N. PETERS, PHOTO-LITHOGRAPHER, WASHINGTON, D. C.

UNITED STATES PATENT OFFICE.

ALLEN BEACH, OF BOSTON, MASS., ASSIGNEE OF HENRY H. GILMORE.

IMPROVEMENT IN PIPE-TONGS.

Specification forming part of Letters Patent No. 19,842, dated April 6, 1858; Reissue No. 2,283, dated June 12, 1866.

*To all whom it may concern:*

Be it known that HENRY H. GILMORE, formerly of the city of Boston, in the county of Suffolk and State of Massachusetts, but now of Medford, in Middlesex county, in said State, invented an Improvement in Adjustable Pipe-Tongs; and I, ALLEN BEACH, of said Boston, the said GILMORE'S sole assignee, do hereby declare that the following is a full and exact description thereof, reference being had to the accompanying drawings, and to the letters of reference marked thereon.

The object and use of said invention is to supply in one instrument the means of grasping firmly, for the purposes for which pipe-tongs are used, any size of pipe within reasonable limits, thereby avoiding the existing necessity of having to possess and transport a pair of tongs for nearly every size of pipe to be operated upon.

The nature of the invention consists in slotting that portion of one of the parts of an ordinary pair of pipe-tongs through which the uniting-pivot passes, so that the distance between the griping parts of the jaws may be varied by changing the position of the slotted part of the tongs in relation to the pivot, thereby changing the relative positions of the hooked and straight jaws; also, in the described method, or its equivalent, whereby the slotted part of the tongs is so clamped to the pivot that the strain consequent upon the use of the tongs shall not separate the jaws by slipping the pivot in the slotted jaw.

To enable those skilled in the art to make and use said invention, I will proceed to describe its construction and operation.

Figure 1:
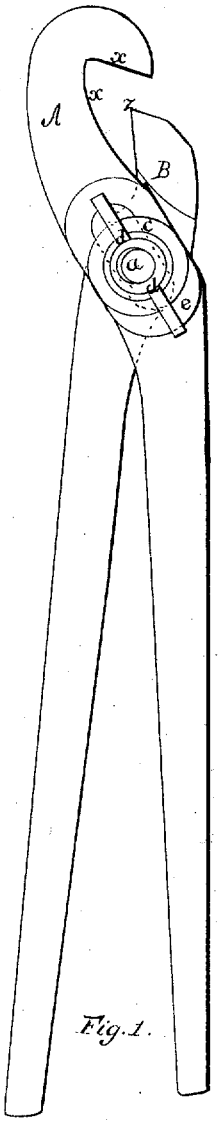
Figure 2:
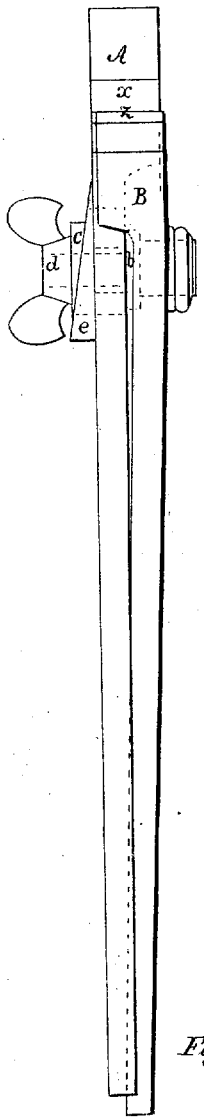
Figure 3:
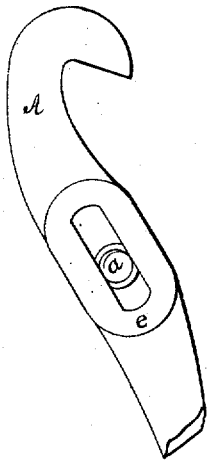

Figure 1 is a side view of a pair of pipe-tongs constructed in accordance with my invention. Fig. 2 is a front view of the same, and Fig. 3 is a detail, showing the slot and pivot in the hooked jaw.

The hooked jaw A and straight jaw B are constructed in the parts where the pipe is grasped in the usual well-known manner, and therefore need no description here; but the part of A through which the pivot *a* passes is slotted and increased in size to compensate for the strength lost by the slot. The pivot *a* is secured in B, so that it can turn therein, or so that when *a* is prevented from turning B can move about *a* as a center. The collar *b* formed on *a* supports A, which is clamped between *b* and the washer *c* by the nut *d*. *a* is flattened where it passes through the slot in A (see Fig. 3) to prevent the pivot from turning therein. The inclined plane *e* forms part of A, or is fixed to it. The washer *c* under the nut *d* is also an inclined plane. A projection on the under side of *c* fits the sides of the groove in A and prevents the washer from turning with the nut.

It will be obvious from inspection of the drawings that any strain which tends to separate the two parts of the tongs in the direction of their length or to increase the distance between *x x*, surfaces of A, and the steeled edge *z* of B, must cause the inclined plane of *c* to move on the inclined plane *e*, increasing the distance between the upper surface of the collar *b* and the lower surface of the nut. This cannot be done without stretching or breaking the pivot *a* by direct tensile strain.

The tongs constructed as just described may be set to any desired distance between *x x* and *z* within the range of the instrument.

A substitute for the inclined planes above described may be made by forming teeth or indentations on the upper surface of A and the lower surface of the washer *c*, the inclined planes being dispensed with. These teeth would be kept interlocked by the nut *d*. To set the instrument it would be necessary to slack the nut and adjust the position of the jaws before tightening it. It is evident that the distance of *x x* from *z* cannot thus be varied by a less amount than the distance of teeth apart, and that the strain which tends to separate *x x* and *z* in this construction would exert no tensile strain on the pivot, but would be exerted on the teeth or indentations described.

This invention relates only to that class of implements in which the holding-jaws are forced upon and obtain their gripe on cylindrical bodies by the grasp of the hand on two levers, as in smiths' tongs, in contradistinction to wrenches, which have but one lever or handle, and which do not obtain their hold on pipes or similar objects by the grasp from the hand of the operator.

Having described said invention, what I claim as new therein, and desire to secure by Letters Patent of the United States, is—

1. Constructing either member of a pair of pipe-tongs with a slot or its equivalent, so that by the relative adjustment of the jaw and pivot the gripe of the tongs can be accommodated to various sizes of pipes, substantially as herein described.

2. The combination of an inclined plane or planes, or the equivalent thereof, with the slotted jar, for the purpose described.

ALLAN BEACH,
*Sole Assignee of H. H. Gilmore.*

Witnesses:
J. B. CROSBY,
J. E. FALLON.